June 24, 1930.   A. A. WILSON ET AL   1,766,318
SHOCK ABSORBING DEVICE FOR AUTOMOBILES
Filed Dec. 17, 1927   2 Sheets-Sheet 1
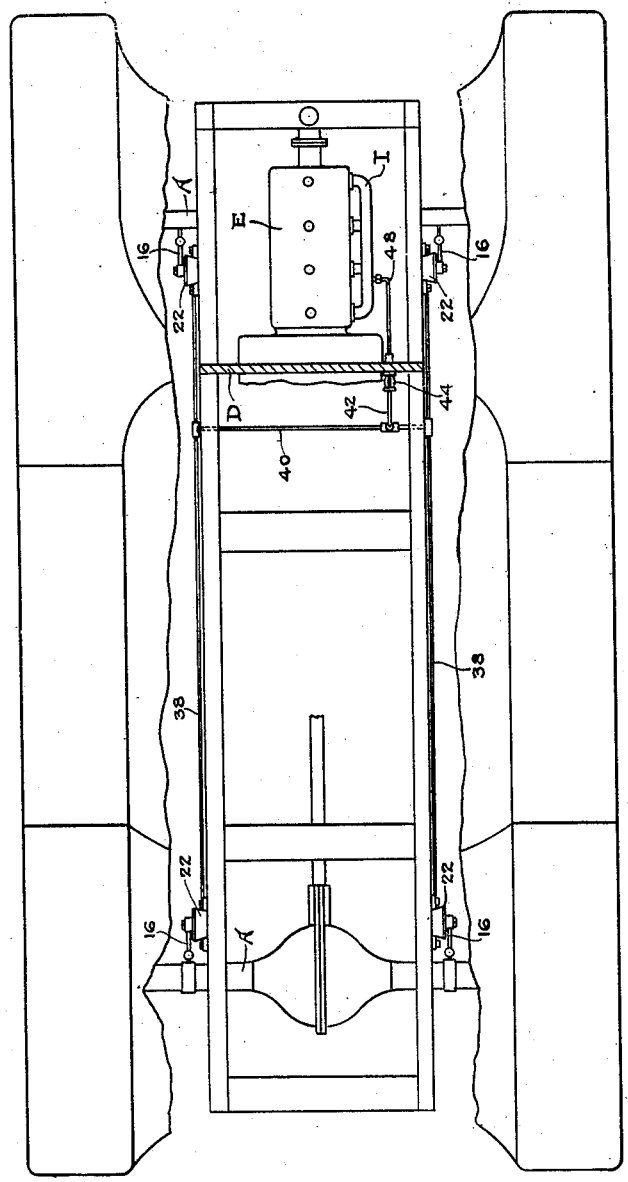
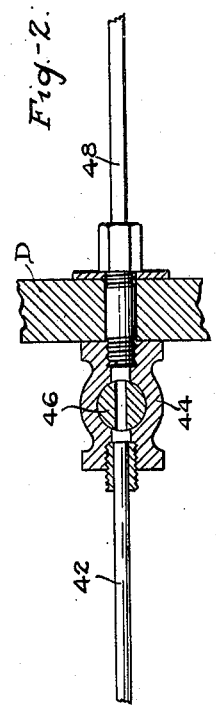
Inventors.
A. A. Wilson.
A. D. Robertson.
By Whiteley and Ruckman
Attorneys.

June 24, 1930. A. A. WILSON ET AL 1,766,318
SHOCK ABSORBING DEVICE FOR AUTOMOBILES
Filed Dec. 17, 1927 2 Sheets-Sheet 2
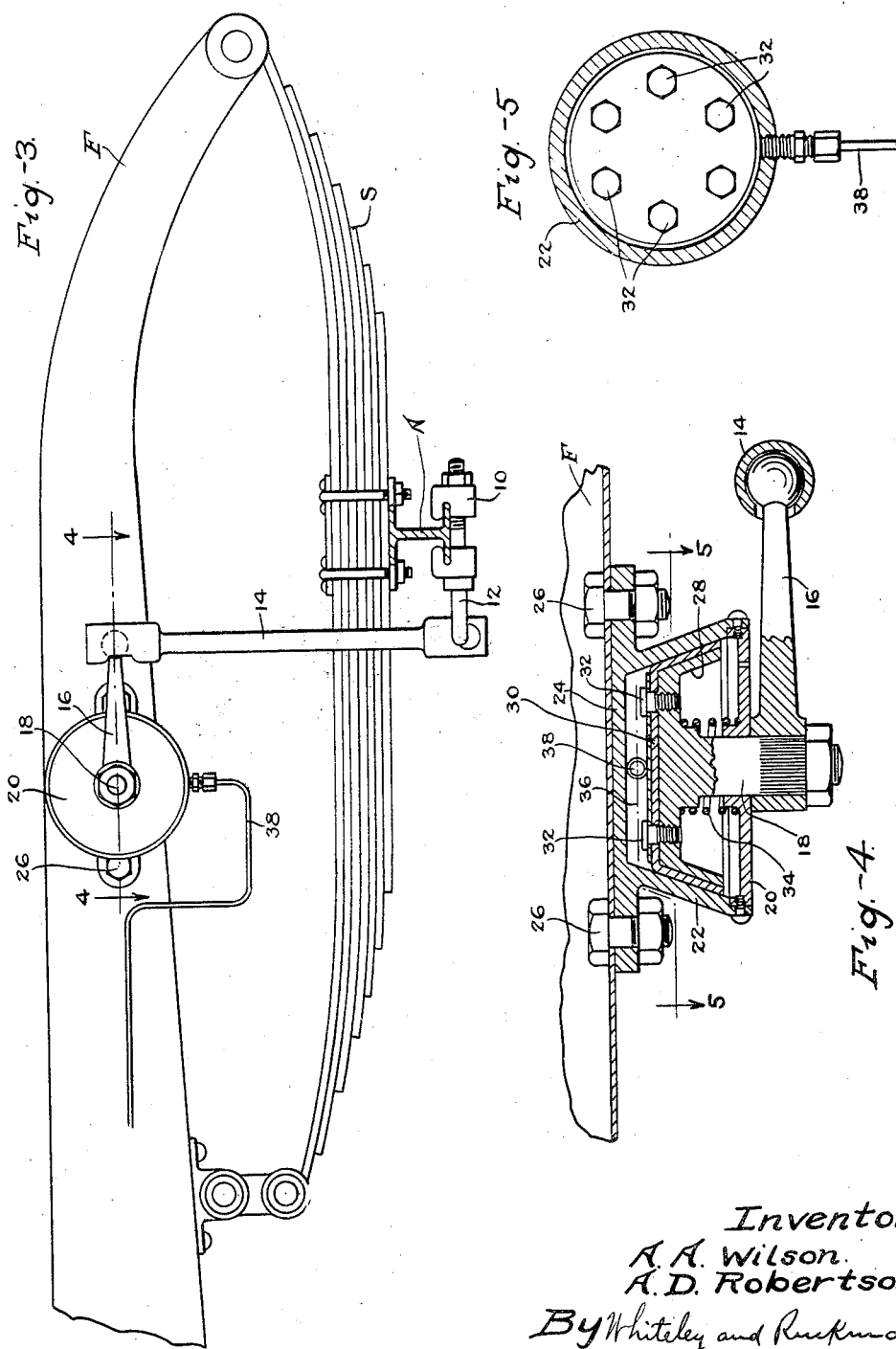
Inventors.
A. A. Wilson.
A. D. Robertson.
By Whiteley and Ruckman
Attorneys.

Patented June 24, 1930

1,766,318

UNITED STATES PATENT OFFICE

ALBERT A. WILSON AND ALEXANDER D. ROBERTSON, OF MINNEAPOLIS, MINNESOTA

SHOCK-ABSORBING DEVICE FOR AUTOMOBILES

Application filed December 17, 1927. Serial No. 240,792.

Our invention relates to shock-absorbing devices for automobiles. It is well known that when automobiles which are being driven strike bumps and depressions in the highway, the upward movement of the vehicle springs unless restrained causes a rebound which not only shakes up the occupants of the automobile but also sometimes causes breakage of the springs. It is therefore customary to employ shock absorbers to prevent rebound. An object of our invention is to provide a shock absorber which embodies a tapered cylinder, one associated with each of the four wheels of the automobile, a tapered piston rotatably mounted in the cylinder, a device by which the tapered surfaces of the cylinder and piston are held in frictional engagement with each other, and a device connected with the piston for causing a shock-absorbing action. Another object is to provide a shock absorber of this character in which the tapered surfaces are held in frictional engagement with each other by the vacuum produced by the suction of the engine while running.

The full objects and advantages of our invention will appear in connection with the detailed description thereof, and the novel features of our inventive idea will be particularly pointed out in the claims.

In the accompanying drawings which illustrate a practical embodiment of our invention,—

Fig. 1 is a top plan view of an automobile partly broken away and showing our device applied. Fig. 2 is a view on an enlarged scale in central section through a valve and casing therefor. Fig. 3 is a fragmentary side elevational view of an automobile frame with our shock absorber applied thereto. Fig. 4 is a view in section on the line 4—4 of Fig. 3. Fig. 5 is a view in section on the line 5—5 of Fig. 4.

The automobile may be of any standard construction, the form shown in the drawings including frame members F to which are attached springs S secured to axles A. It will be understood that similar springs are employed near the ends of both axles and that similar restraining means are provided for each of the springs. A clamp or securing device such as indicated at 10 and secured to the axle carries a rod 12 to the free end of which the lower end of a link 14 is pivotally attached as by means of a ball and socket connection. The upper end of the link 14 is pivotally attached as by means of a ball and socket connection to a crank arm 16 which is secured to the outer end of a stem 18 rotatably mounted in a bearing at the center of a cover plate 20. This plate is secured to the outer and larger end of a tapered cylinder 22 whose other end is closed by a plate 24 having outstanding flanges which are secured to the frame F by bolts 26. The stem 18 is secured to or formed integrally with a tapered piston 28 which works in the tapered piston. A cup shaped member 30 of flexible material such as leather or other frictional material is secured to the outside of the piston by screws 32 so that this material is interposed between the tapered surfaces of the piston and cylinder. A coiled spring 34 which surrounds the stem 18 and is interposed between the cover plate 20 and the head of the piston tends to hold the tapered surfaces in engagement with each other with a force dependent upon the stiffness of the spring. Ordinarily, we prefer to use a spring which is not stiff enough to produce the full frictional engagement which is necessary. The tapered surfaces are so related to each other that even when firmly engaged with each other, there is a chamber 36 between the head of the piston and the inner end 24 of the cylinder. A pipe 38 is tapped through the cylinder 22 so as to be in communication with the chamber 36 and this pipe is also in communication with the intake manifold I of the engine E. In the embodiment as shown in Fig. 1, the pipes 38 are extended in such manner that the front and rear cylinders on the left side are connected by a common pipe 38 while the front and rear cylinders on the right side are connected by another common pipe 38. The two pipes 38 are connected with each other by a cross pipe 40 from which a pipe 42 extends upwardly and then forwardly for attachment to a valve casing 44 secured to the dash D and containing a rotary valve 46 adapted to be turned by the driver into either open or closed or any intermediate position. The other side of the casing 44 is connected by a pipe 48 with the intake manifold I.

The operation and advantages of our invention will now be obvious. The device may be readily installed in automobiles already in use and may also be provided as part of the standard equipment when the automobiles are manufactured. Assuming the valve 46 to be open to the desired extent, it will be understood that the chamber 36 will be subjected to vacuum when the engine is running and that this will cause the piston to be drawn firmly into frictional engagement with the cylinder. When the wheels of the automobile strike a bump or depression, the frictional engagement between the cylinder and the piston causes resistance to turning movement of the piston so that upward movement of the springs or the rebound is neutralized. If the spring 34 be made stiff enough, a similar result is accomplished. If vacuum is relied upon to a considerable extent, the amount of restraining action may be readily controlled by the driver upon turning the valve 46. When the automobile is running over smooth pavement, this valve may be entirely closed since it may then be considered preferable to have the vehicle springs operate without the shock-absorbing restraint imposed by the vacuum. It will be noted that the outer end of piston 28 stops short of the cover plate 20 of the cylinder so that sufficient in-and-out movement of the piston is provided for.

On account of the tapering surface, this range of movement is comparatively small. It is to be noted further that with the arrangement shown in Fig. 1, the shock-absorbing effect is equalized for all four wheels of the vehicle since the vacuum is applied uniformly and simultaneously to the four cylinders.

We claim:

1. In combination with the internal combustion engine of an automobile, a tapered cylinder mounted on the automobile, a tapered piston rotatably mounted in said cylinder, a pipe connection between the smaller end of said cylinder and the intake of the engine whereby said piston is subjected to suction produced in the engine cylinders, and a device connected with said piston for causing a shock absorbing action.

2. In combination with the internal combustion engine of an automobile, a tapered cylinder mounted on the automobile, a tapered piston rotatably mounted in said cylinder, a pipe connection between the smaller end of said cylinder and the intake of the engine whereby said piston is subjected to suction produced in the engine cylinders, a stem carried by said piston extending outside of said cylinder, a crank arm secured to said stem, and a connection between said arm and the axle of the automobile.

3. In combination with the internal combustion engine of an automobile, a tapered cylinder mounted on the automobile, a tapered cylinder rotatably mounted in said cylinder, a pipe connection between the smaller end of said cylinder and the intake of the engine whereby said piston is subjected to suction produced in the engine cylinders, a stem carried by said piston extending outside of said cylinder, a spring surrounding said stem and interposed between the head of said piston and the larger end of said cylinder, a crank arm secured to said stem, and a connection between said arm and the axle of the automobile.

4. In combination with the internal combustion engine of an automobile, tapered cylinders mounted on the frame of the automobile adjacent the ends of both axles of the automobile, tapered pistons rotatably mounted in said cylinders respectively, a pipe system connected to the smaller ends of said cylinders and also connected to the intake of the engine whereby all of said pistons are subjected to suction produced in the engine cylinders, and connections between said pistons and the axles for causing a shock absorbing action for all four wheels of the vehicle.

5. A shock absorbing device for automobiles comprising a bracket rigidly secured to the axle of the automobile and having an arm extending horizontally therefrom adjacent the outer plane of the frame and springs, a friction member comprising stationary and rotary parts, a horizontal arm fast on the rotary parts, a link connecting the rigid arm with the last named arm by means of ball and socket joints at the ends thereof, and means for creating a vacuum on the inside of the movable friction member to cause air pressure to move it inwardly to engage the stationary friction member.

6. A shock absorbing device for automobiles comprising a friction member fast on the frame of the automobile shaped to form a chamber, a movable friction member in said chamber and shaped to engage a wall of the fixed friction member, means for producing negative pressure inside the movable friction member to cause it to engage said surface with a yielding pressure, and a connection between said movable member and the axle of the automobile.

In testimony whereof we hereunto affix our signatures.

ALBERT A. WILSON.
ALEXANDER D. ROBERTSON.